(12) United States Patent
Labonté

(10) Patent No.: US 7,793,947 B2
(45) Date of Patent: Sep. 14, 2010

(54) GOALIE SKATE

(75) Inventor: Ivan Labonté, Montreal (CA)

(73) Assignee: Bauer Hockey, Inc., Greenland, NH (US)

( * ) Notice: Subject to any disclaimer, the term of this patent is extended or adjusted under 35 U.S.C. 154(b) by 1298 days.

(21) Appl. No.: 11/057,768

(22) Filed: Feb. 15, 2005

(65) Prior Publication Data

US 2006/0181035 A1    Aug. 17, 2006

(51) Int. Cl.
  *A63C 1/00*    (2006.01)
(52) U.S. Cl. .................... 280/11.12; 280/11.3; 280/841
(58) Field of Classification Search .............. 280/11.12,
  280/11.19, 11.224, 11.225, 811, 841, 843;
  36/87, 114, 115, 116
  See application file for complete search history.

(56) References Cited

U.S. PATENT DOCUMENTS

| 2,404,083 | A |   | 7/1946 | Murray |
| 4,876,806 | A |   | 10/1989 | Robinson et al. |
| D324,447 | S |   | 3/1992 | Purdom |
| 5,236,776 | A | * | 8/1993 | Fitchmun et al. ............. 442/254 |
| 5,312,669 | A | * | 5/1994 | Bedard ........................ 428/105 |
| 5,997,014 | A | * | 12/1999 | Ellis et al. .............. 280/11.214 |
| 6,769,203 | B1 |   | 8/2004 | Wright et al. |
| 6,871,424 | B2 | * | 3/2005 | Labonte et al. ................ 36/115 |
| 2002/0071946 | A1 | * | 6/2002 | Norton et al. ............ 428/304.4 |
| 2002/0190487 | A1 | * | 12/2002 | Blankenburg et al. ..... 280/11.12 |

\* cited by examiner

*Primary Examiner*—J. Allen Shriver, II
*Assistant Examiner*—Vaughn T Coolman

(57) ABSTRACT

A goalie skate having a skate boot comprising a thermoformed outer shell with a sole and an ankle portion for receiving the ankle of the foot, the ankle portion comprising medial and lateral sides for facing the medial and lateral malleoli respectively, the medial side comprising an upper edge that is a first distance away from the sole and the lateral side comprising an upper edge that is a second distance away from the sole, the first distance being greater than the second distance. By having a goalie skate boot that has the lateral upper edge located below the medial upper edge, the lateral outward flexion of the foot is eased when the goalie skate is in an angled position. The invention also relates to a goalie skate with a skate boot comprising an outer shell that is thermoformed such that it comprises an integrated toe portion, thereby eliminating the traditional toe cap.

14 Claims, 11 Drawing Sheets

GOALIE SKATE

FIELD OF THE INVENTION

The present invention relates to a goalie skate having a boot made of a thermoformable material.

BACKGROUND OF THE INVENTION

In hockey, the role of the goalie differs significantly from the role of the other hockey players. For example, the goalie spends far more time standing in front of the net than skating around the ice rink. In addition, the way in which the goalie stands and moves is quite different from the way the other players stand and move.

It is common that during a game of hockey, a goalie might assume an angled position wherein the goalie's skates are positioned at oblique angles in relation to the ice surface. In other words, the goalie stands such that the blades of the skates are not vertically parallel as they would normally be for a defenceman or a forward standing at rest. Instead, the goalie's skates are angled away from the goalie's body thereby widening the points of contact between the goalie and the ice and bringing the goalie's knees together.

Furthermore, goalies are often known to adopt a "butterfly position" whereby their knees flex and their feet are spread apart in order to cover as much of the lower portion of the net as possible.

A deficiency with existing goalie skates is that they may cause discomfort to goalies during the course of a game of hockey. For example, a deficiency with existing goalie skates is that when the goalie assumes an angled position, the upper edge of the lateral side of the skate boot may dig into the lateral side of the goalie's leg. Obviously, this can cause the goalie discomfort, and can limit the range of movement available to the goalie.

Accordingly, there is a need in the industry for a goalie skate that takes into consideration the types of movements performed by goalies, in order to provide a more comfortable and better designed goalie skate that alleviates at least in part the deficiencies described above. Moreover, there is need for a goalie skate that provides the goalie with an improved range of motion such that the goalie can more easily assume a "butterfly" position. There is also a need for a goalie skate boot in which the toe portion is integrally formed with the medial and lateral sides of the boot in order to eliminate the traditional toe cap.

SUMMARY OF THE INVENTION

A first aspect of the invention relates to a goalie skate with a skate boot comprising an outer shell that is thermoformed such that it comprises an ankle lateral upper edge located below the ankle medial lateral upper edge. A second aspect of the invention relates to a goalie skate with a skate boot having an outer shell that is thermoformed such that it comprises an integrated toe portion, thereby eliminating the traditional toe cap.

As embodied and broadly described herein, the present invention provides a goalie skate for enclosing a human foot, the foot having a heel, an ankle with a medial malleolus and a lateral malleolus, medial and lateral sides, a plantar surface and toes. The goalie skate has (a) a skate boot comprising an outer shell made of a thermoformable material, the outer shell being thermoformed such that it comprises: (i) a sole for facing the plantar surface of the foot; (ii) a heel portion for receiving the heel of the foot; (iii) medial and lateral side portions for facing the medial and lateral sides of the foot respectively; and (iv) an ankle portion for receiving the ankle of the foot, the ankle portion comprising a medial side having an upper edge that is a first distance away from the sole and a lateral side having an upper edge that is a second distance away from the sole, the first distance being greater than the second distance; and (b) a rigid shell comprising a toe portion for protecting the toes and a bottom portion for receiving an ice skate blade.

As embodied and broadly described herein, the present invention also provides a goalie skate for enclosing a human foot, the foot having a heel, an ankle with a medial malleolus and a lateral malleolus, medial and lateral sides, a plantar surface and toes. The goalie skate has a skate boot comprising an outer shell made of a thermoformable material, the outer shell being thermoformed such that it comprises: (a) a heel portion for receiving the heel of the foot; (b) medial and lateral side portions for facing the medial and lateral sides of the foot respectively; and (c) an ankle portion for receiving the ankle of the foot, the ankle portion comprising a medial side having a medial upper edge and a lateral side having a medial upper edge, the lateral upper edge being located below the medial upper edge such that lateral outward flexion of the foot is eased when the goalie skate is in an angled position relative to the ground.

Furthermore, the present invention relates to a goalie skate for enclosing a human foot, the foot having a heel, an ankle with a medial malleolus and a lateral malleolus, medial and lateral sides, a plantar surface and toes. The goalie skate comprises (a) a skate boot comprising an outer shell made of a thermoformable material, the outer shell being thermoformed such that it comprises: (i) a heel portion for receiving the heel of the foot; (ii) medial and lateral side portions for facing the medial and lateral sides of the foot respectively; (iii) an ankle portion for receiving the ankle of the foot; and (iv) a toe portion for facing the toes of the foot; and (v) a sole for facing the plantar surface of the foot; and (b) a rigid shell comprising a base for receiving the sole of the outer shell, a toe portion for at least partially covering the toe portion of the outer shell and a bottom portion for receiving an ice skate blade.

The present invention also relates to a goalie skate for enclosing a human foot, the foot having a heel, an ankle with a medial malleolus and a lateral malleolus, medial and lateral sides, a plantar surface and toes. The goalie skate comprises a skate boot comprising an outer shell made of a thermoformable material, the outer shell being thermoformed such that it comprises: (i) a heel portion for receiving the heel of the foot; (ii) medial and lateral side portions for facing the medial and lateral sides of the foot respectively; the medial and lateral side portions comprising foldable skirt portions projecting therefrom for forming a sole for facing the plantar surface of the foot; and (iii) an ankle portion for receiving the ankle of the foot, the ankle portion comprising a medial side having a medial upper edge and a lateral side having a medial upper edge, the lateral upper edge being located below the medial upper edge such that lateral outward flexion of the foot is eased when the goalie skate is in an angled position relative to the ground; and a rigid shell comprising a toe portion for protecting the toes, a base for facing the sole of the outer shell, medial and lateral walls and a heel portion extending upwardly from the base, the medial and lateral walls, heel portion, toe portion and base defining a cavity for receiving at least partially the skate boot.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

A detailed description of examples of implementation of the present invention is provided hereinbelow with reference to the following drawings, in which.

Figure 1:
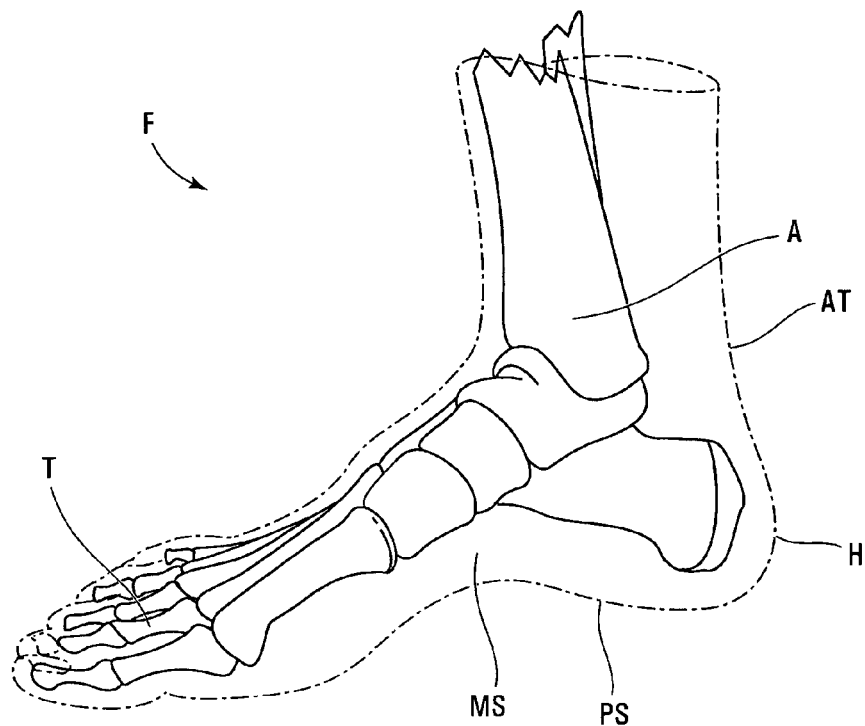
FIG. 1 is a side view of a right human foot with the integument of the foot shown in stippled lines and the bones shown in solid lines.

In the drawings, embodiments of the invention are illustrated by way of example. It is to be expressly understood that the description and drawings are only for the purposes of illustration and as an aid to understanding, and are not intended to be a definition of the limits of the invention.

DETAILED DESCRIPTION OF THE EMBODIMENTS

To facilitate the description, any reference numerals designating an element in one figure will designate the same element if used in any other figures. In describing the embodiments, specific terminology is resorted to for the sake of clarity but the invention is not intended to be limited to the specific terms so selected, and it is understood that each specific term comprises all equivalents.

Figure 2:
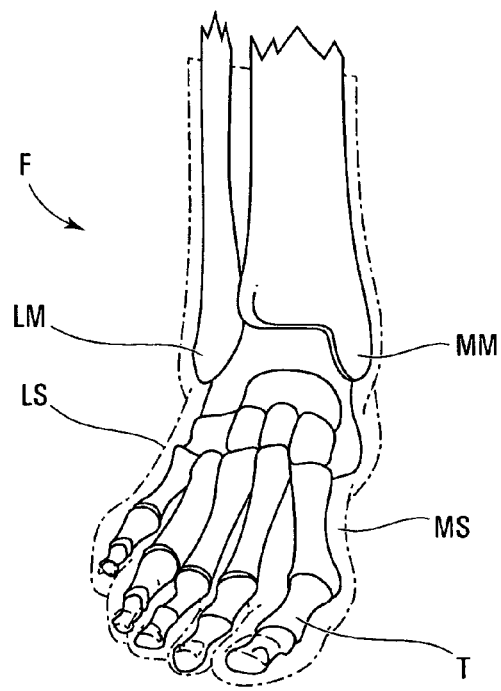
FIG. 2 is a front view of the human foot of FIG. 1.

Shown in FIGS. 1 and 2 is a typical human foot F that has toes T, a plantar surface PS, a medial side MS and a lateral side LS, a heel H, an Achilles tendon AT and an ankle A having a lateral malleolus LM and a medial malleolus MM, the lateral malleolus LM being at a lower position than the medial malleolus MM.

Referring to FIGS. 3 to 7, a first embodiment of a goalie skate is identified by the reference numeral 1. The goalie skate 1 has a skate boot 10 and a rigid shell 20. The rigid shell 20 has a toe portion 21 for covering at least partially the toe portion of the boot 10, a base 25 for receiving the bottom surface of the skate boot 10, and a bottom portion 23 with an ice skate blade receiving portion 27 for receiving an ice skate blade 18. The ice skate blade receiving portion 27 may comprise a longitudinal slot for receiving the blade 18 (see FIGS. 6 and 7). The bottom portion 23 may also comprise pedestals 29 connecting the base 25 and the ice skate blade receiving portion 27. Moreover, the rigid shell 20 may comprise a medial wall 31, a lateral wall 33 and a heel portion 35, the walls 31, 33 and the heel portion 35 extending upwardly from the base 25.

Figure 3:
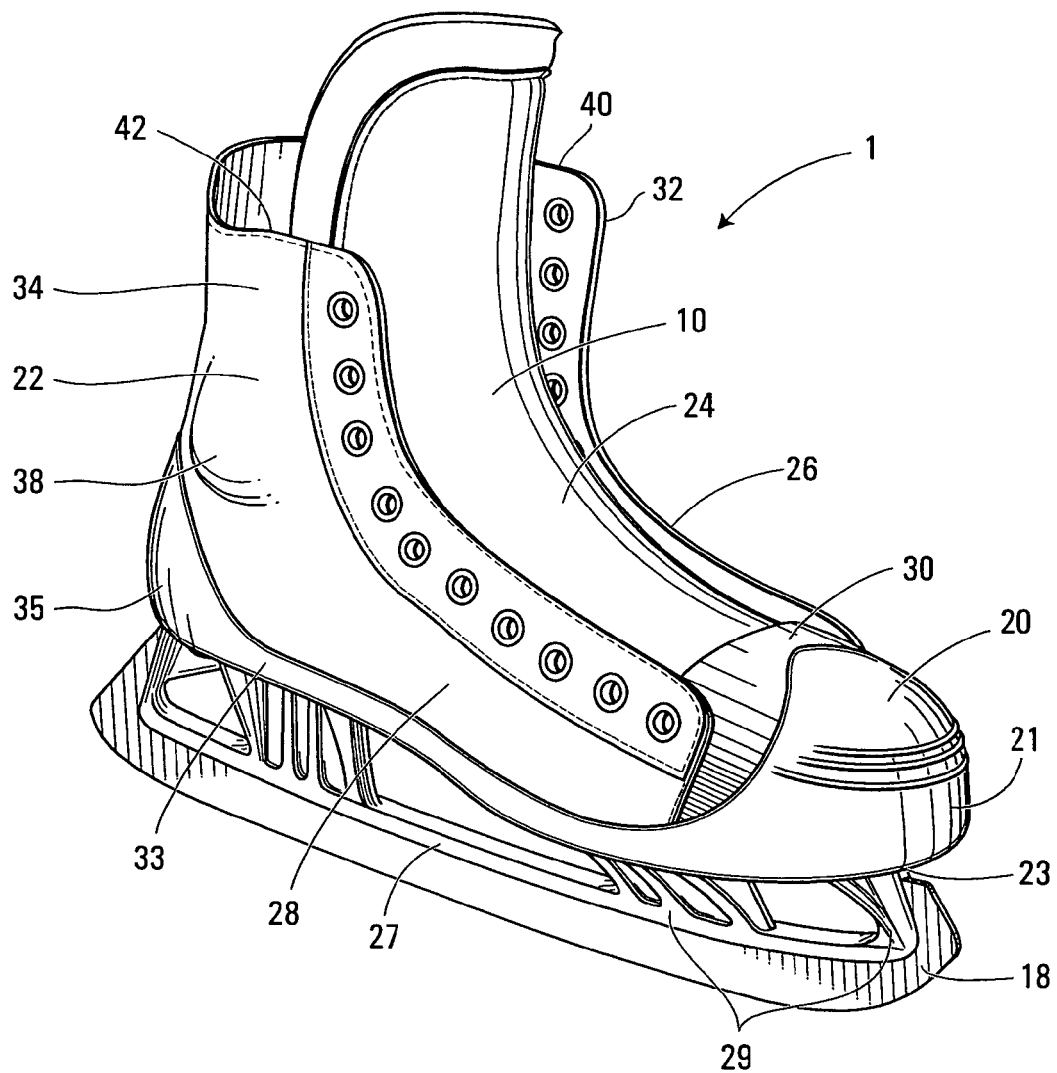
FIG. 3 is a perspective view of a goalie skate in accordance with a first embodiment of the present invention.
Figure 4:
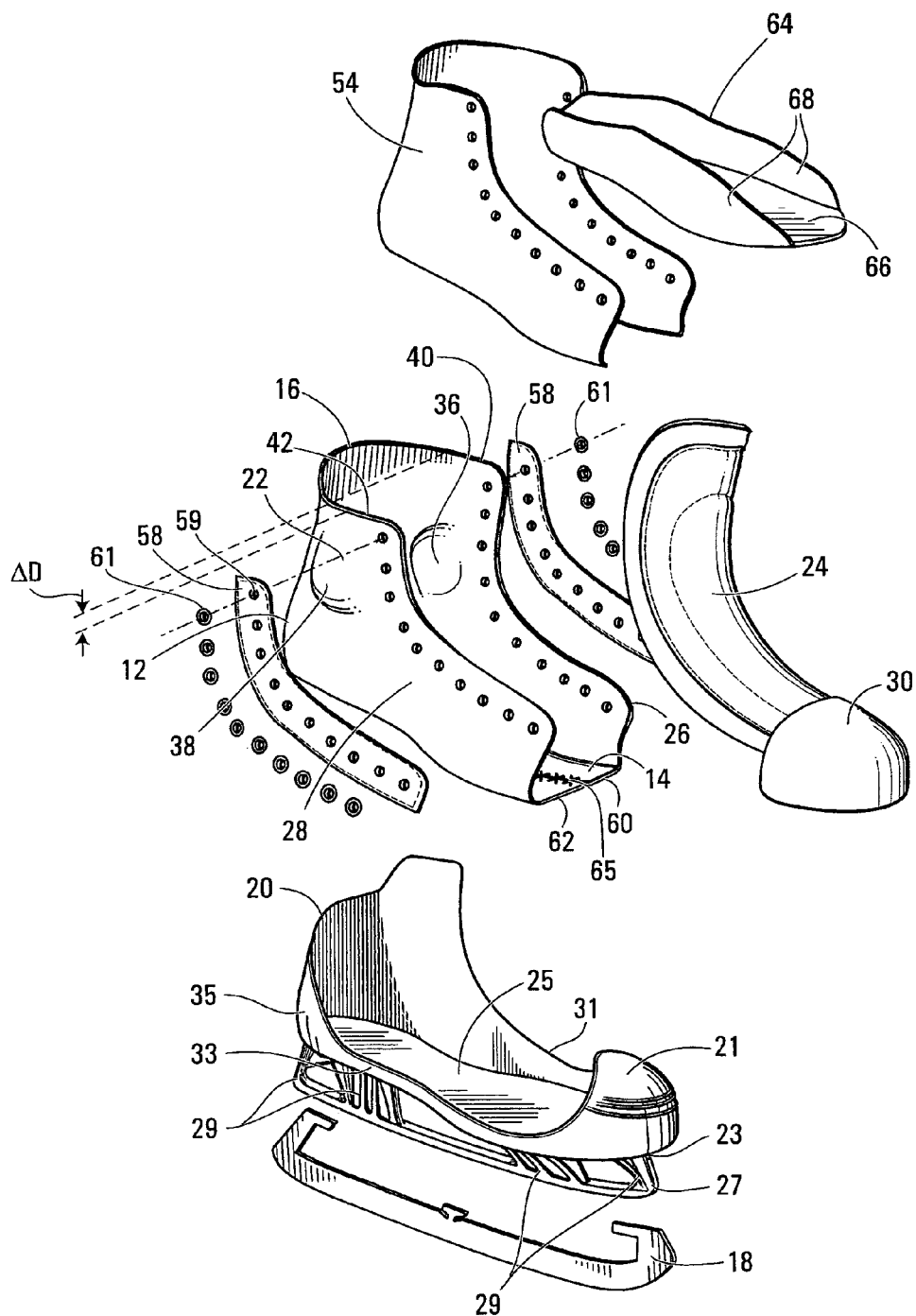
FIG. 4 is an exploded view of the goalie skate of FIG. 3.

As seen in FIGS. 3 and 4, the heel portion 35, the walls 31, 33, the toe portion 21 and the base 25 define a cavity for receiving at least partially the skate boot 10. The rigid shell 20 may be a cowling as illustrated in FIGS. 3, 4, 6 and 7. It is however understood that the rigid shell may be integrally formed with the skate boot in another embodiment.

As shown in FIG. 4, the skate boot 10 comprises an outer shell 16 that is made of a thermoformable material. As used herein, the expression "thermoformable material" refers to a material that is capable of softening or fusing when heated and of hardening again when cooled. Some non-limiting examples of different types of thermoformable material comprise ethylene vinyl acetate (EVA) foam, polyethylene foam, polystyrene foam, polypropylene foam and thermoformable materials sold under the trade-marks MEGABIX®, SURLYN®, SONTARA®, FORMO500®, BYLON®, MOSOCA® and NYLON® 66.

The outer shell 16 is thermoformed such that it comprises a heel portion 12 substantially cup shaped for following the contour of the heel H, medial and lateral side portions 26, 28 for facing the medial and lateral sides MS, LS of the foot F, respectively, and an ankle portion 22 for receiving the ankle A. The ankle portion 22 may have respective medial and lateral cup-shaped depressions 36, 38 for receiving the respective medial and lateral malleoli MM, LM. The lateral cup-shaped depression 38 is located slightly lower than the medial cup-shaped depression 36 for conforming to the morphology of the ankle A. Naturally, the ankle portion 22 would not have cup-shaped depressions for receiving the malleoli should such ankle portion does not cover such malleoli. The ankle portion 22 may follow the rear profile of the Achilles tendon AT.

The medial and lateral side portions 26, 28 comprise respective skirt portions 60, 62 for forming a sole 14 for facing the plantar surface PS. The skirt portions 60, 62 are adapted to be folded inwardly so as to be affixed together to form the sole 14. As shown in FIG. 4, the skirt portions 60, 62 are affixed together via stitching 65 along a longitudinal central line. The medial and lateral skirt portions 60, 62 may have equal widths, such that when folded inwardly they are affixed together along a central longitudinal axis of the outer shell 16. It should be understood, however, that the medial and lateral skirt portions can be of different widths, such that when they are folded inwardly, they are affixed together along a longitudinal line that is closer to either the medial side portion 26 or the lateral side portion 28.

It should be understood that the skirt portions 60, 62 may be affixed together in a variety of different manners without departing from the spirit of the invention, such as via adhesive, thermal bonding, piping, zipper, staples and a projection/groove arrangement. Alternatively, the medial and lateral skirt portions 60, 62 could be affixed together via interlocking components that fit together in order to affix the two skirt portions together. For example, one of the skirt portions can include an arrangement of grooves, and the other skirt portion can include an arrangement of corresponding projections that are able to interlock with the grooves. As such, by interlocking the corresponding grooves and projections, the medial and lateral skirt portions can be affixed together.

The skate boot 10 may further comprise an inner lining 54 having a surface intended for contact with the heel H, the ankle A and the lateral and medial sides LS, MS and a footbed 64 adapted to be inserted within this skate boot. The inner lining 54 may be glued and/or stitched to the inner surface of the thermoformed shell 16. The footbed 64 has a sole portion 66 for receiving the plantar surface PS of the foot F, and a padding wall 68 that surrounds the heel H and faces the medial side MS and lateral side LS. The footbed 64 can be inserted into the thermoformed shell 16 in order to sit upon the sole 14 formed either by the two foldable skirt portions 60, 62, or against a sole that is a separate component.

The skate boot 10 may also comprise a tongue 24, a toe cap 30 and two narrow bands 58 that are secured to the upper portion of each of side portions 26, 28. The narrow bands 58 are made of fabric, textile or leather. In an alternative embodiment, a single continuous band that covers the upper portion of each of side portions 26, 28 and wraps around the rear of the ankle portion 22 can be used instead of two distinct bands 58. Apertures 59 are punched through the narrow bands 58, the thermoformed shell 16 and the inner lining 54. Once punched, the apertures 59 are reinforced by metallic rivets 61 or any suitable means as is well known in the art of footwear construction. The tongue 24 and toe cap 30 may be affixed to the thermoformed shell 16. In a non-limiting embodiment, the toe cap 30 and the tongue 24 are pre-assembled prior to installation to thermoformed shell 16. The tongue 24 is affixed to the toe cap 30 and extends upwardly and rearwardly from the toe cap 30 for covering the forefoot of the foot F. The frontal edge of the tongue 24 can be sewn directly to the toe cap 30 or can be fixed in an alternative manner known in the art. The toe cap 30 can be secured to the thermoformed shell 16 by sewing both sides of toe cap 30 to each of side portions 26, 28.

In a non-limiting embodiment, the thermoformed shell 16 is made of a single integral component. However, it should be understood that the thermoformed shell 16 could also be made of multiple sections without departing from the spirit of the invention. For example, the thermoformed shell 16 could be made from separate medial and lateral side portions that are affixed together to form a shell having the three-dimensional shape shown in FIG. 4. In a non-limiting example of implementation, the thermoformed shell 16 is made of a composite sheet comprising a layer of thermoformable foam.

In an embodiment not shown in the drawings, the skate boot 10 may have a rigid ankle support which is positioned between the thermoformed shell 16 and the inner lining 54. The rigid ankle support is adapted for providing more support and rigidity in the general ankle area. It should be understood that in the cases where the thermoformed shell 16 is rigid enough to support the ankle A, there is no need to include a rigid ankle support.

Figure 5:
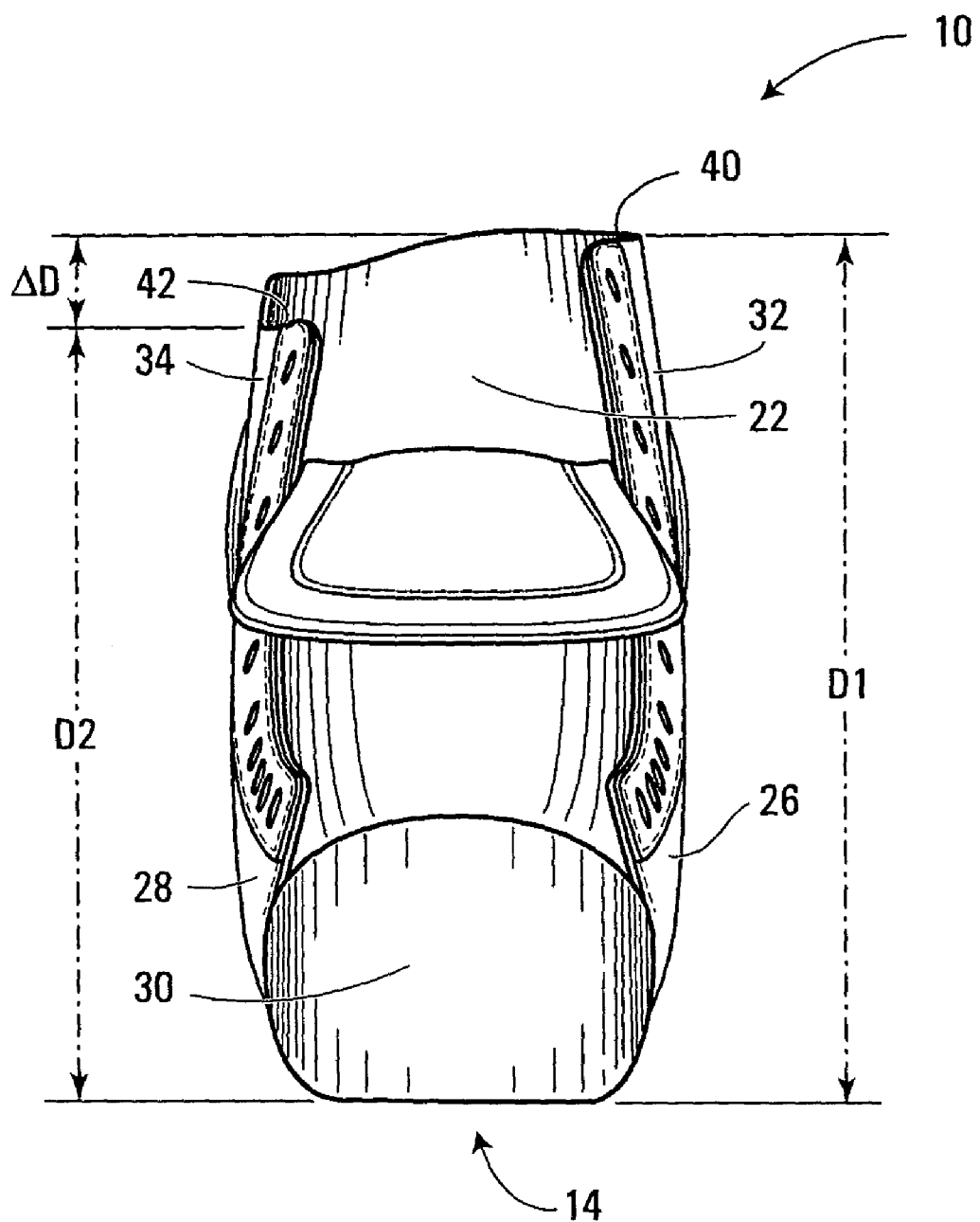
FIG. 5 is a front plan view of the goalie skate boot of FIG. 3.

Referring to FIGS. 3 to 7, the ankle portion 22 of the outer shell 16 comprises a medial side 32 having an upper edge 40 and a lateral side 34 having an upper edge 42. As best shown in FIG. 5, the upper edge 40 is a first distance D1 away from the sole 14, and the upper edge 42 is a second distance D2 away from the sole 14, the distance D1 being greater than the distance D2. The medial and lateral sides 32, 34 have therefore different heights since the lateral wall 34 does not extend as high up as the medial wall 32. In other words, the lateral upper edge 42 is located below the medial upper edge 40, the difference of height being identified as ΔD. Note that the skate boot 10 shown in FIGS. 3 to 5 is for a right foot. In a non-limiting embodiment, the difference of height ΔD may be between 5 to 10 mm. In an alternative non-limiting embodiment, the difference of height ΔD may be between 10 to 20 mm.

It is understood that the outer shell 16 and the inner lining 54 may have medial and lateral sides of corresponding different heights such that the skate boot 10, once assembled, has also medial and lateral sides of different heights as illustrated in FIGS. 3, 5, 6 and 7. The medial and lateral sides 32, 34 may cover the malleoli as illustrated herein; however, it is also understood that the medial and lateral sides may have respective medial and lateral upper edges that are located just below the medial and lateral malleoli respectively.

Figure 6:
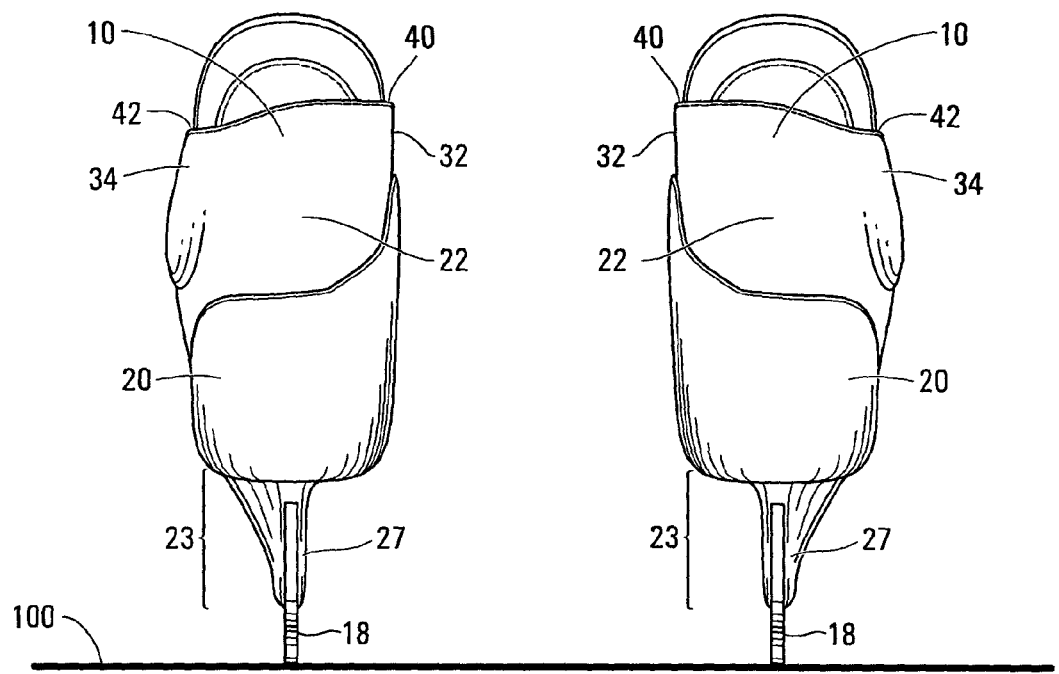
FIG. 6 is a back view of a pair of goalie skates illustrated an upright position.
Figure 7:
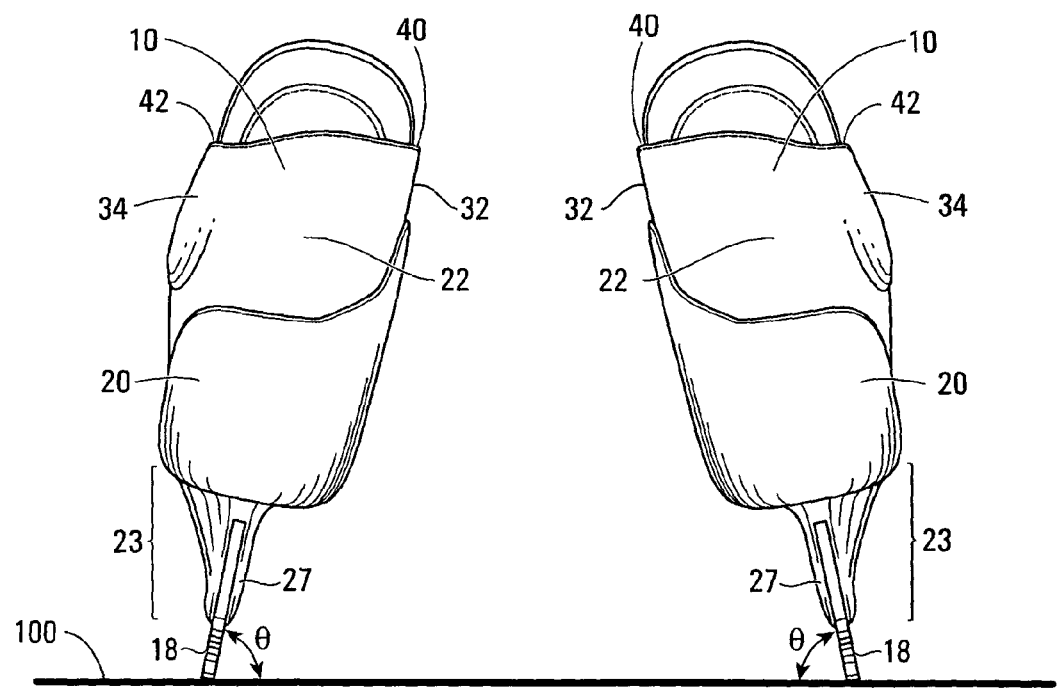
FIG. 7 is a back view of the pair of goalie skates illustrated in an angled position.

FIG. 6 is a back view of a pair of goalie skates illustrated in an upright position. As shown in that figure, the upper edges 40 of the medial walls 32 are higher in relation to the ground 100 than the upper edges 42 of the lateral walls 34. Shown in FIG. 7, is the same pair of goalie skates positioned in an angled position, wherein the blades 18 are positioned at an oblique angle θ in relation to the ground 100. By having a goalie skate boot that has the lateral upper edge 42 located below the medial upper edge 40, the lateral outward flexion of the foot is then eased when the goalie skate is in the angled position shown in FIG. 7.

Figure 8:
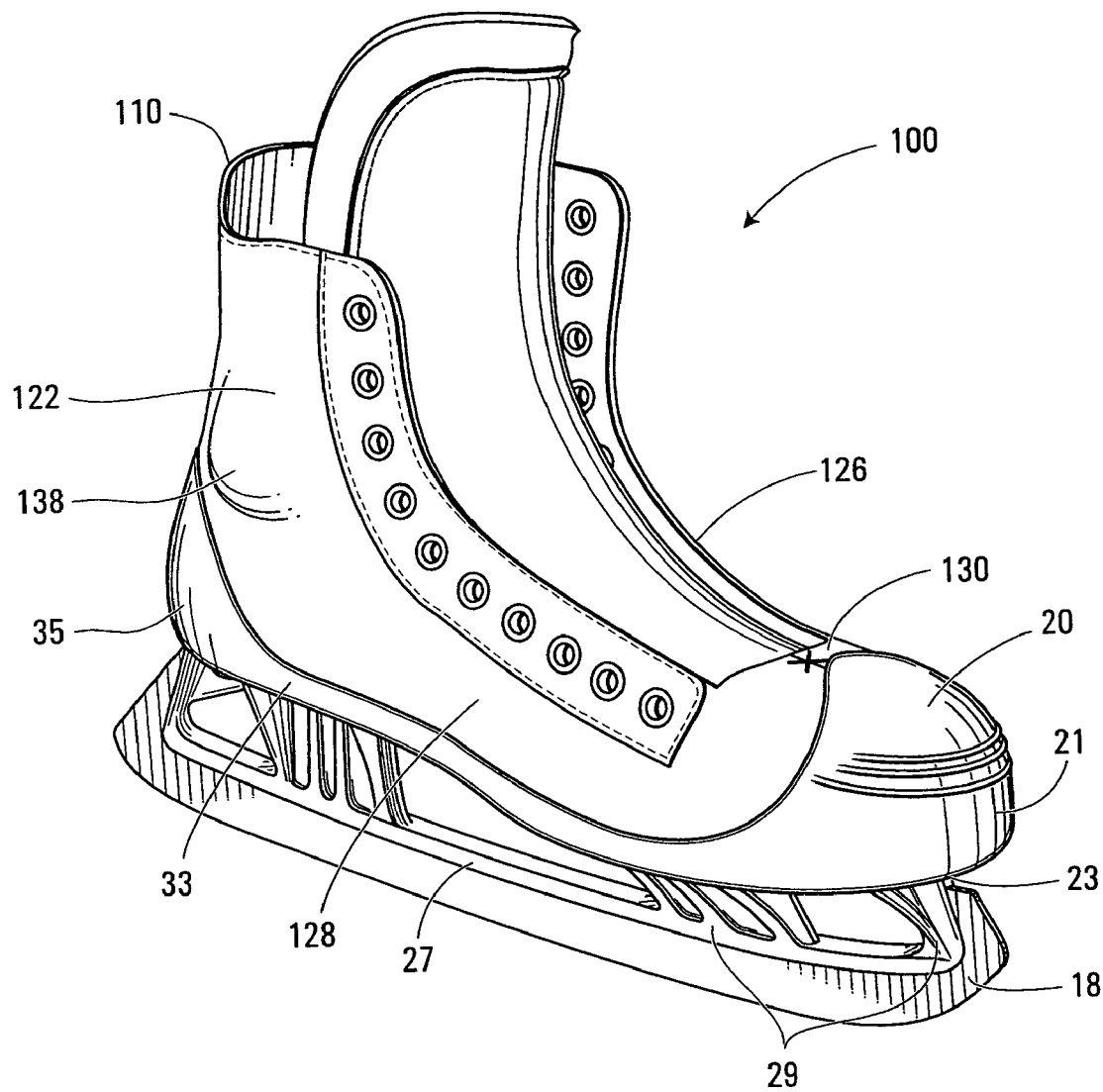
FIG. 8 is a perspective view of a goalie skate in accordance with a second embodiment of the present invention.
Figure 9:
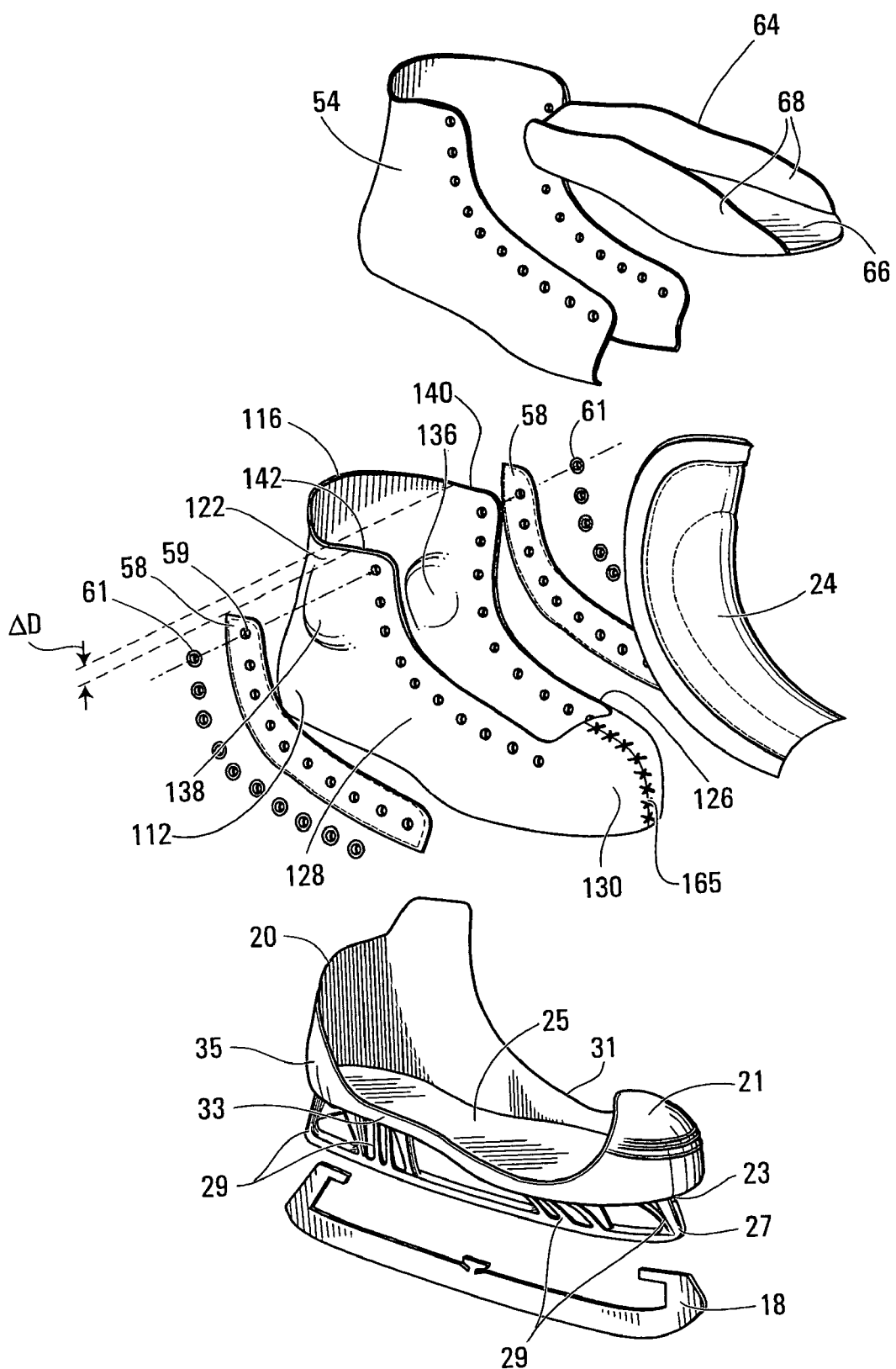
FIG. 9 an exploded view of the goalie skate of FIG. 8.

FIGS. 8 and 9 show a second embodiment of a goalie skate 100 wherein the skate boot 110 has an outer shell 116 that is made of a thermoformable material and is thermoformed such that it comprises a heel portion 112 substantially cup shaped for following the contour of the heel H, medial and lateral side portions 126, 128 for facing the medial and lateral sides MS, LS of the foot F, respectively, an ankle portion 122 for receiving the ankle A, the ankle portion 122 comprising medial and lateral upper edges 140, 142, and a toe portion 130 facing the toes T of the foot F. Hence, because outer shell 116 comprises an integrated toe portion 130 facing the toes T, there is no need for a separate toe cap 30 that is secured to the thermoformed shell 16 as illustrated in FIG. 4.

The ankle portion 122 may have respective medial and lateral cup-shaped depressions 136, 138 for receiving the respective medial and lateral malleoli MM, LM. The lateral cup-shaped depression 138 is located slightly lower than the medial cup-shaped depression 136 for conforming to the morphology of the ankle A.

Moreover, as for the outer shell 16, the lateral upper edge 142 of the outer shell 116 is located below the medial upper edge 140, the difference of height being identified as ΔD. Note that the skate boot 110 is for a right foot. In a non-limiting embodiment, the difference of height ΔD may be between 5 to 10 mm. In an alternative non-limiting embodiment, the difference of height ΔD may be between 10 to 20 mm. Again, by having the lateral upper edge 142 located below the medial upper edge 140, the lateral outward flexion of the foot is then eased when the goalie skate 100 is in the angled position.

Figure 10:
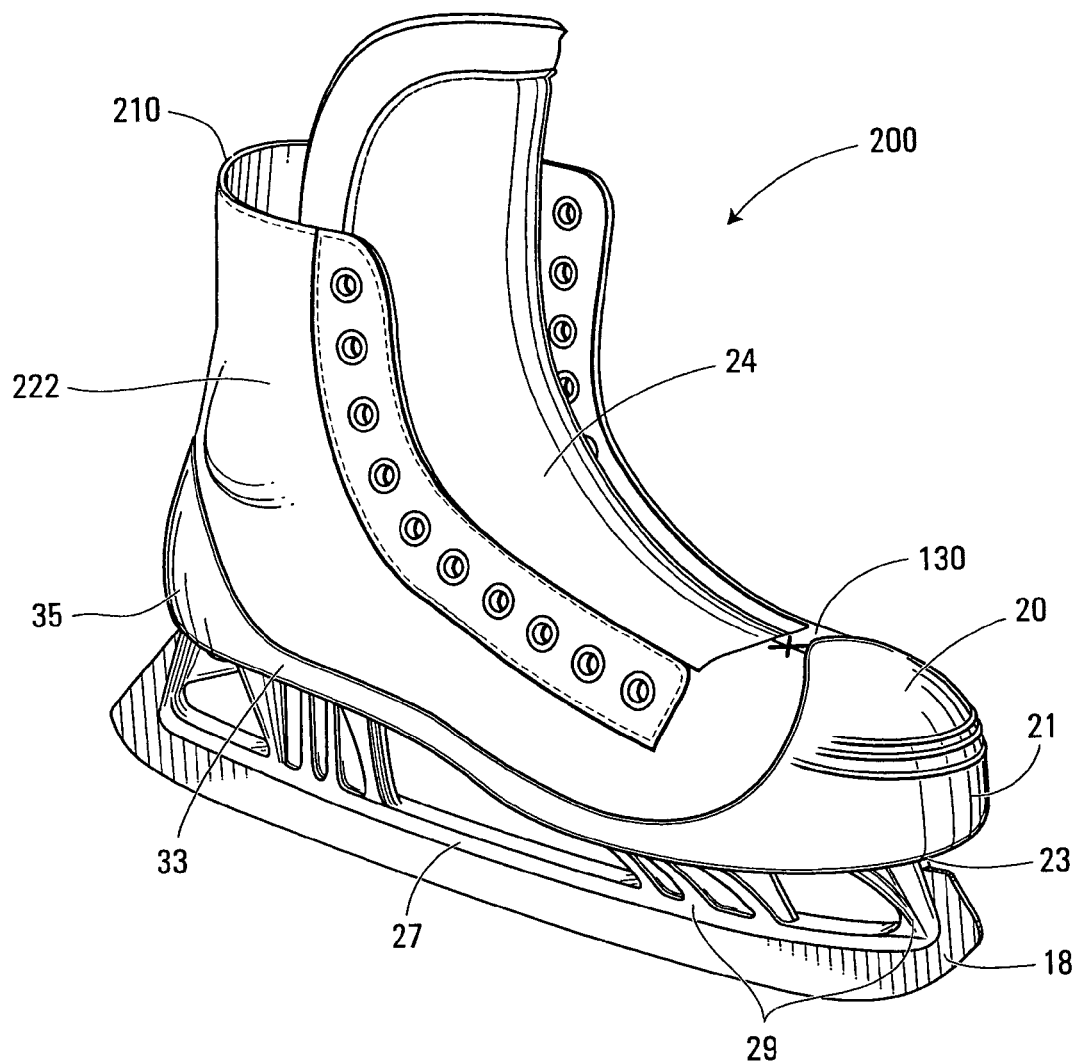
FIG. 10 is a perspective view of a goalie skate in accordance with a third embodiment of the present invention.
Figure 11:
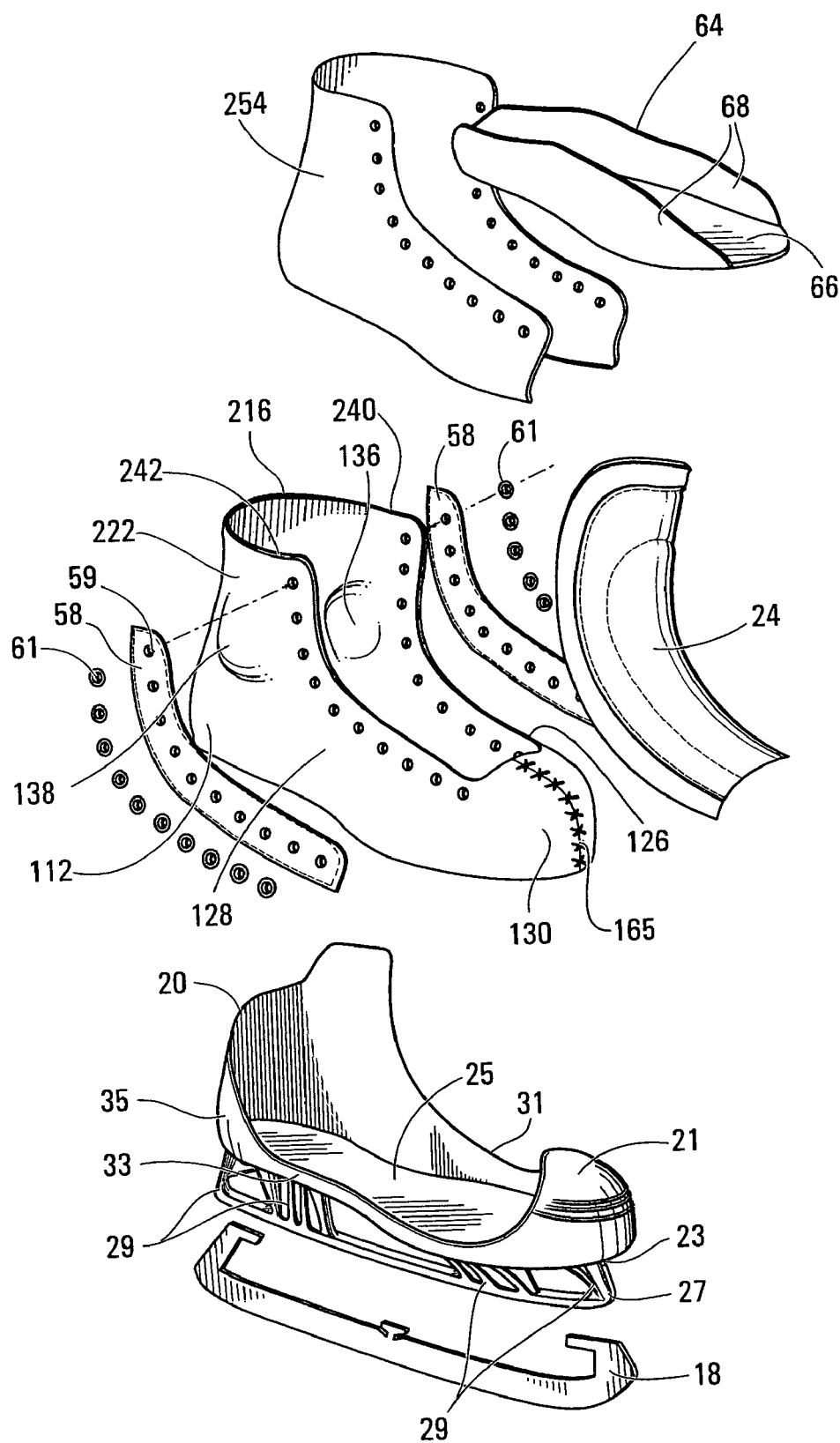
FIG. 11 an exploded view of the goalie skate of FIG. 10.

FIGS. 10 and 11 show a third embodiment of a goalie skate 200 wherein the skate boot 210 is identical to the skate boot 110 and wherein the components are designated by the same reference numerals. The only difference resides in the construction of the outer shell 216 in which the ankle portion 222 comprises medial and lateral upper edges 240, 242 that are at the same height. Moreover, the skate boot 210 has an inner lining 254 having medial and lateral upper edges that are also at the same height.

Figure 12:
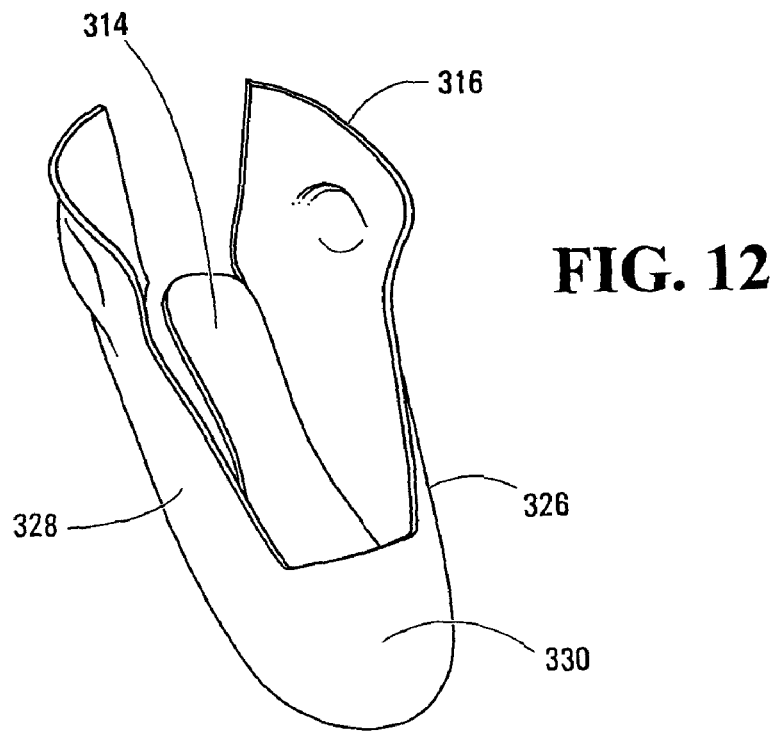
FIG. 12 is a top perspective view of an outer shell in accordance with another embodiment.
Figure 13:
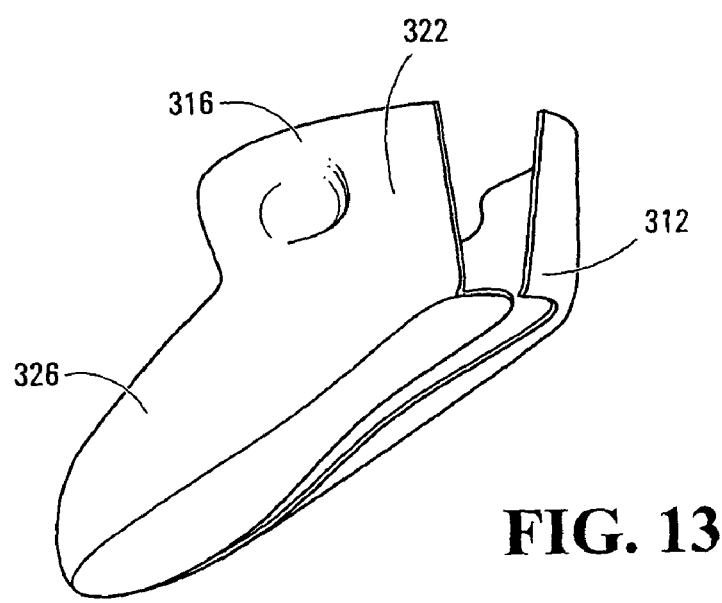
FIG. 13 is a bottom perspective view of the outer shell of FIG. 12.

FIGS. 12 and 13 show another outer shell 316 that is thermoformed such that it comprises a heel portion 312 substantially cup shaped for following the contour of the heel H, medial and lateral side portions 326, 328 for facing the medial and lateral sides MS, LS of the foot F, respectively, an ankle portion 322 for receiving the ankle A, and a toe portion 330 facing the toes T of the foot F. Again, because the outer shell 316 comprises an integrated toe portion 330 facing the toes T, there is no need for a separate toe cap 30 that is secured to the thermoformed shell 16 as illustrated in FIG. 4. A sole 314 is integrally formed with one of the medial side portions (the medial side portion 326 as shown in FIGS. 12 and 13) and the medial and lateral side portions 326, 328 may be affixed together at the rear and along the sole 314.

In order to manufacture the outer shell 16, a pre-cut sheet of thermoformable material may be inserted in the cavity of one of a male-female mold. The male and female portions of the molds define the inner and outer surfaces of outer shell 16 respectively.

The pre-cut sheet is aligned and temporarily secured to one of the mold portions using any suitable means to accurately position the pre-cut sheet within the mold and maintain same in position when the mold is closed. Once the mold is closed over the pre-cut sheet, the mold is heated up to the thermoforming temperature of the pre-cut sheet and male and female portions are pressed against the pre-cut sheet.

The pre-cut sheet of thermoformable material may be a composite sheet comprising layers of different thermoformable materials. It is understood that the pre-cut sheet can be thermoformed with a pre-cut sheet of the inner lining 54, instead of securing the inner lining 54 to outer shell 16 after the thermoforming operation. Naturally, the material of the inner lining 54 must be selected from materials that may sustain the thermoforming temperature of the outer shell 16.

In a preferred embodiment of the invention, heat and pressure are applied simultaneously for a period of 15 seconds to 2 minutes after which the mold is allowed to cool down so that the pre-cut sheet will set to the three-dimensional shape defined by the male and female portions of the mold. Preferably, heat and pressure are applied simultaneously for a period of 45 seconds to 1 minute. The applied heat is generally between 250° F. and 350° F., with the preferred temperature being approximately 325° F. The applied pressure is generally between 75 psi and 150 psi, with the preferred pressure being approximately 125 psi. It is understood that the amount of time, temperature and pressure may be different if a cooled mold is used.

Figure 14:
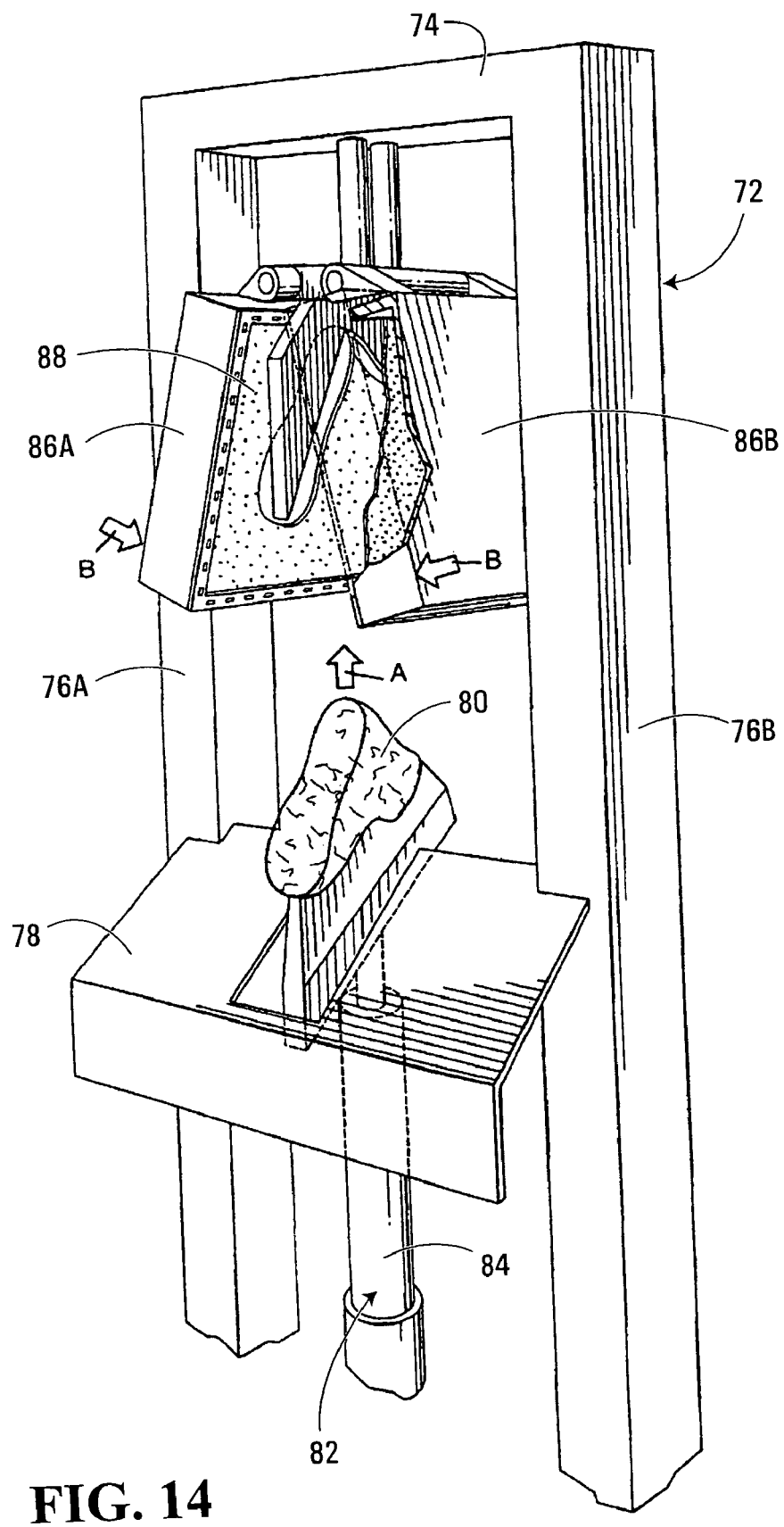
FIG. 14 is a perspective view of a thermoforming apparatus.

Instead of using a male-female mold, an apparatus 72 as shown in FIG. 14 may be used for thermoforming a pre-cut sheet of thermoformable material into the shape of the outer shells 16, 116, 226, 326. The pre-cut sheet of thermoformable material may be a composite sheet comprising layers of different thermoformable materials. The sheet may be made of thermoforming materials such as those sold under the trademark MEGABIX® (a core of extruded SURLYN®, a backing of SONTARA® and a hot melt coating; thickness of 0.95 mm), FORMO500® (non woven polyester with a core of extruded polyolefinic, stiffening layers of synthetic latex on each side and an ethylene vinyl acetate hot melt adhesive on one side; thickness of 1.50 mm), BYLON® (a nylon multifilament with a backing of black saturated needle punched polyester nonwoven and a face coating of non-fray urethane) and MOSOCA® (NYLON® 66 with a core of SURLYN® and a PU coating). The composite sheet may also be made of a first sheet of polyethylene high density (HDPE) foam; a second sheet of thermoplastic; and a third composite sheet made of a first layer of cotton, a second layer of surlyn fibers, a third layer of a mesh of nylon fibers and a coating.

The apparatus 72 comprises a supporting frame 74 having an outer shell traverse and two pillars 76A and 76B. The two pillars 76A and 76B are joined together at mid-height by a ledge 78 that contains a control panel (not shown) with control buttons (not shown) for enabling an operator to control the apparatus 72. In the specific embodiment shown, the ledge 78 surrounds a last 80 that is supported by a movable support 82. The movable support 82 is a hydraulic or pneumatic piston cylinder 84 that is movable up and down in a vertical direction, as indicated by arrow A. It should be understood that lasts 80 of different shapes and sizes can be installed on apparatus 72, in order to manufacture outer shells of different shapes and sizes.

The apparatus 72 further comprises a pair of clamps 86A, 86B that are mounted to the outer shell traverse and positioned directly above last 80. Clamps 86A, 86B are adapted to open and close, as indicated by arrows B in order to clamp around the last 80. The clamps 86A, 86B comprise pressure pads 88 for receiving the sheet of thermoformable material. In addition, each of the clamps 86A, 86B comprises a bladder (not shown) having an inflated membrane and a fluid pressure delivery circuit (not shown) for causing the membrane to inflate, such that it is able to surround the last 80 during use.

In operation, the sheet of thermoformable material is placed on the last 80 and is accurately positioned and secured in place via the use of clips (not shown). Once the sheet is securely in place, the operator activates the apparatus 72 which causes the piston-cylinder 84, and therefore the last 80, to raise up between the two open clamps 86A, 86B. When the last 80 reaches the pressure pads 88, the piston-cylinder 84 reaches a set value and stops. It should be understood that in an alternative embodiment, the last 80 can remain stationary, and the clamps 86A, 86B can be connected to piston-cylinders for lowering the clamps 86A, 86B around the last 80.

Once the last 80 is positioned between clamps 86A, 86B, the clamps 86A, 86B begin to close thereby causing the pressure pads 88 to apply an initial pressure to the sheet of thermoformable material situated on the last 80. When the clamps 86A, 86B are completely closed, the bladders are then inflated by air or liquid injection, which forces the flexible membranes of the bladders to encircle the sheet around the last 80 and apply pressure thereto. Once the pressure within the bladders has reached a set value wherein the bladder membranes apply an even pressure to the sheet, the pressure is maintained for a certain amount of time, and is then released.

In a non-limiting example of implementation, a pressure between 30 psi and 120 psi is maintained around the last for approximately 1 to 2 minutes. In addition to the pressure, heat is also applied to the sheet of thermoformable material. The applied heat is generally between 250° F. and 550° F., with the preferred temperature being approximately 450° F. Once heated, the sheet becomes malleable and, as such, is able to acquire the three-dimensional shape applied to it by the last 80. The clamps 86A, 86B are afterwards opened up and the last 80 is lowered by the piston cylinder 84 to its original position.

By utilizing different grades of thermoformable material, different thermoformable materials or the same material with different density, the designers are able to vary the mechanical properties of the outer shells 16, 116, 216, 316.

A last may be inserted into the inside cavity of the outer shell in order to complete the construction of the boot. The last enables the outer shell to maintain its shape when skirt portions 60, 62 are folded and affixed together. As shown in FIG. 4, the skirt portions 60, 62 may be affixed together via stitching 65 along a longitudinal central line. As indicated previously, the skirt portions 60, 62 may be affixed together in a variety of different manners without departing from the spirit of the invention, such as via adhesive, thermal bonding, piping, zipper staples and a projection/groove arrangement. Once the skirt portions 60, 62 are firmly attached together and the boot has acquired its final shape, a light sanding of the folded skirt portions 60, 62 may be performed to partially even the lower surface of the boot and provide a flat surface on which the rigid shell 20 can be glued or nailed.

Alternatively, an insole may be positioned inside the skirt portions 60, 62. It is understood that the insole is an optional component and may not be required if the rigidity of the skirt portions 60, 62 is sufficient. Once the assembly is completed, the boot is placed upside down into a lasting machine. Glue is first applied to the bottom surface of the insole along its periphery. Skirt portions 60, 62 are then folded over the last onto the bottom surface of the insole. Once folded, skirt portions 60, 62 are bonded to the insole by the glue that was previously laid on the bottom surface of the insole. The skirt portions 60, 62 are further nailed, stitched, or tacked all around the insole to provide the necessary mechanical grip and allow the glue to properly set between the skirt portions 60, 62 and the insole. Once the skirt portions 60, 62 are firmly attached to the insole and the boot has acquired its final shape, a light sanding of the folded skirt portions 60, 62 may be performed to partially even the lower surface of the boot and provide a flat surface on which the rigid shell 20 can be glued or nailed.

The above description of embodiments should not be interpreted in a limiting manner since other variations, modifications and refinements are possible within the spirit and scope of the present invention. The scope of the invention is defined in the appended claims and their equivalents.

The invention claimed is:

1. A goalie ice skate comprising:
    (a) a boot having an outer shell for receiving a human foot, the foot having a heel, an ankle with a medial malleolus and a lateral malleolus, medial and lateral sides, a plantar surface and toes, said outer shell being made of a composite sheet comprising a layer of a thermoformable material, wherein said composite sheet is thermoformed such that said outer shell forms: i) a sole for facing the plantar surface of the foot; ii) a heel portion for receiving the heel of the foot; iii) medial and lateral side portions for receiving the medial and lateral sides of the foot respectively; and iv) an ankle portion for receiving the medial malleolus and the lateral malleolus of the ankle of the foot, said ankle portion comprising a medial side having a medial upper edge extending along a first straight line that is a first distance away from said sole and a lateral side having a lateral upper edge extending along a second straight line that is a second distance away from said sole, wherein said first distance is greater than said second distance and wherein said lateral upper edge is entirely located below said medial upper edge; and
    (b) a cowling comprising a toe portion for protecting the toes, a base, medial and lateral walls and a heel portion extending upwardly from said base, and a bottom portion for receiving an ice skate blade, wherein said medial and lateral walls, heel portion, toe portion and base define a cavity for receiving at least partially said boot.

2. A goalie ice skate as defined in claim 1, wherein said composite sheet is thermoformed such that said medial and lateral sides comprise respective medial and lateral cup-shaped depressions for receiving the medial and lateral malleoili respectively.

3. A goalie ice skate as defined in claim 2, wherein said lateral cup-shaped depression is below said medial cup-shaped depression.

4. A goalie ice skate as defined in claim 1, wherein said ice skate blade receiving portion comprises a longitudinal slot for receiving said ice skate blade.

5. A goalie ice skate as defined in claim 1, wherein said base of said cowling is affixed to said sole of said outer shell.

6. A goalie ice skate as defined in claim 1, wherein said second distance is at least 5 mm greater than said first distance.

7. A goalie ice skate as defined in claim 1, wherein said composite sheet is thermoformed such that said heel portion is substantially cup shaped for following the contour of the heel of the foot.

8. A goalie ice skate as defined in claim 1, wherein said bottom portion of said cowling comprises an ice skate blade receiving portion and at least one pedestal connecting said base and said ice skate blade receiving portion.

9. A goalie ice skate as defined in claim 1, wherein said boot comprises a toe cap and a tongue, said toe cap being affixed to each of said medial and lateral side portions of said outer shell.

10. A goalie ice skate as defined in claim 1, wherein said composite sheet is thermoformed such that said medial and lateral side portions comprise foldable skirt portions projecting therefrom for forming said sole of said outer shell.

11. A goalie ice skate as defined in claim 1, wherein said boot is a lasted boot.

12. A goalie ice skate as defined in claim 1, wherein said layer is a layer of thermoformable foam.

13. A goalie ice skate as defined in claim 1, wherein said boot comprises an inner lining having a surface intended for contact with the heel, ankle and lateral and medial sides of the foot, said inner lining being affixed to an inner surface of said outer shell.

14. A goalie ice skate as defined in claim 1, wherein said boot comprises a footbed adapted for being inserted within said skate boot.

* * * * *